United States Patent [19]
Flowers

[11] Patent Number: 5,701,326
[45] Date of Patent: Dec. 23, 1997

[54] LASER SCANNING SYSTEM WITH OPTICAL TRANSMIT/REFLECT MIRROR HAVING REDUCED RECEIVED SIGNAL LOSS

[75] Inventor: Edward Max Flowers, Grand Prairie, Tex.

[73] Assignee: Loral Vought Systems Corporation, Grand Prairie, Tex.

[21] Appl. No.: 639,025

[22] Filed: Apr. 16, 1996

[51] Int. Cl.$^6$ .................. H01S 3/08; G02B 5/10
[52] U.S. Cl. ............... 372/99; 372/98; 372/106; 372/107; 359/839
[58] Field of Search .................. 372/20, 23, 27, 372/49, 50, 92, 98, 99, 105, 106, 107, 108; 359/838, 839, 850, 884

[56] References Cited

U.S. PATENT DOCUMENTS

| | | | |
|---|---|---|---|
| 3,688,218 | 8/1972 | Gleason | 372/99 X |
| 4,009,933 | 3/1977 | Firester | 372/99 X |
| 4,084,883 | 4/1978 | Eastman et al. | 372/99 X |
| 4,101,707 | 7/1978 | Henry | 372/99 X |
| 4,662,722 | 5/1987 | Buczek et al. | 359/839 X |
| 4,691,999 | 9/1987 | Wheeler | 359/839 X |
| 4,713,824 | 12/1987 | Heller | 372/99 |
| 4,856,019 | 8/1989 | Miyata | 372/99 |
| 4,934,784 | 6/1990 | Kapany et al. | 372/99 X |
| 5,114,226 | 5/1992 | Goodwin et al. | 356/5 |
| 5,200,606 | 4/1993 | Krasutsky et al. | 250/216 |
| 5,224,109 | 6/1993 | Krasutsky et al. | 372/29 |
| 5,226,054 | 7/1993 | Yarborough et al. | 372/100 |
| 5,285,461 | 2/1994 | Krasutsky et al. | 372/29 |
| 5,289,491 | 2/1994 | Dixon | 372/92 |
| 5,303,256 | 4/1994 | Sumida | 372/99 X |
| 5,416,321 | 5/1995 | Sebastian et al. | 250/288 |
| 5,428,438 | 6/1995 | Komine | 356/5.01 |

OTHER PUBLICATIONS

*Melles Griot 1995/96 Optics, Opto-Mechanics, Lasers, Instruments*, pp. 4-1 through 4-20 and 5-1 through 5-40, 1995.

*Primary Examiner*—Brian Healy
*Attorney, Agent, or Firm*—Sidley & Austin

[57] ABSTRACT

An optical system transmits a first radiation beam along a first axis and receives a reflected beam along that axis; the first beam having a first wavelength and a p-planar polarization; the second beam having the first wavelength, a p-planar polarized component, an s-planar polarized component, and a greater cross-sectional area than the first beam. The system includes a transmit/reflect mirror positioned at a 45° to the first axis and free of apertures in its optical area, a radiation source, an element for directing radiation from the source along the first axis toward the mirror; an element for directing radiation outwardly from the mirror along the first axis, and for directing the second beam along the first axis toward the mirror. An antireflection coating on the primary side of the mirror passes radiation having the first wavelength and a p-planar polarization. An inner area of a coating on the secondary side of the mirror passes substantially all of the p-planar polarization radiation while reflecting s-planar polarization radiation. An outer area of the secondary coating reflects substantially all radiation incident thereon having the first wavelength.

25 Claims, 5 Drawing Sheets

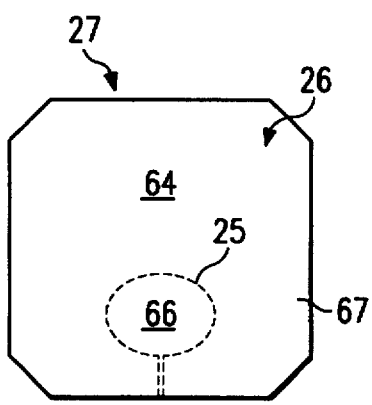
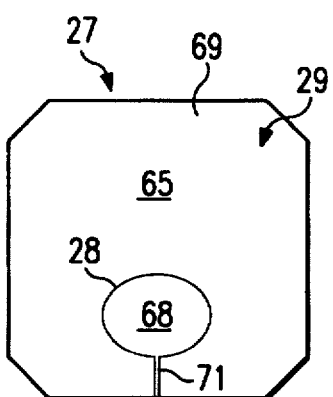
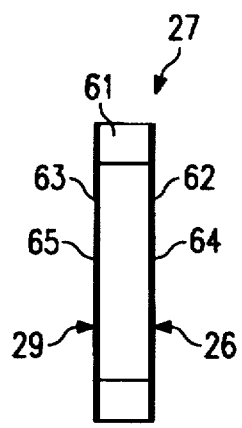
FIG. 2          FIG. 3          FIG. 4
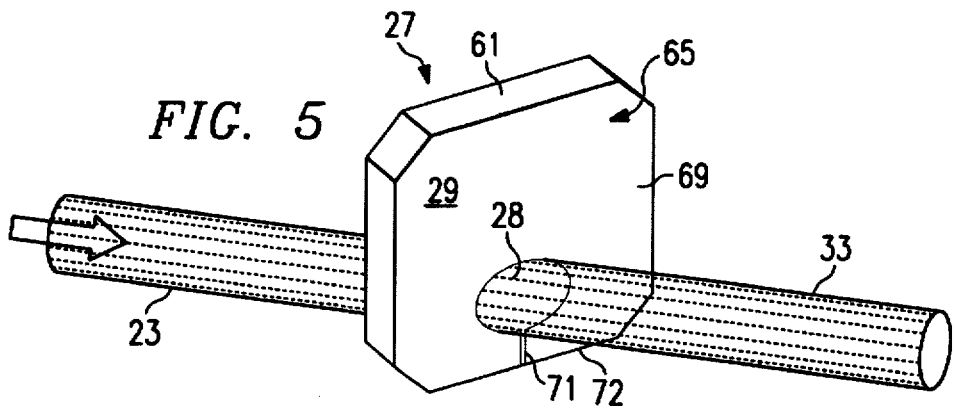
FIG. 5
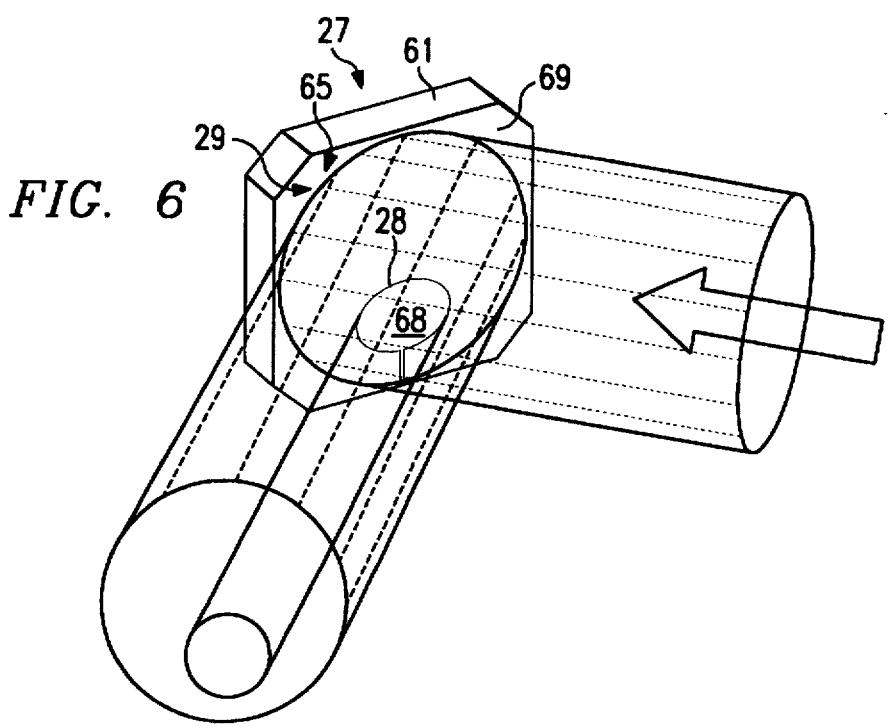
FIG. 6

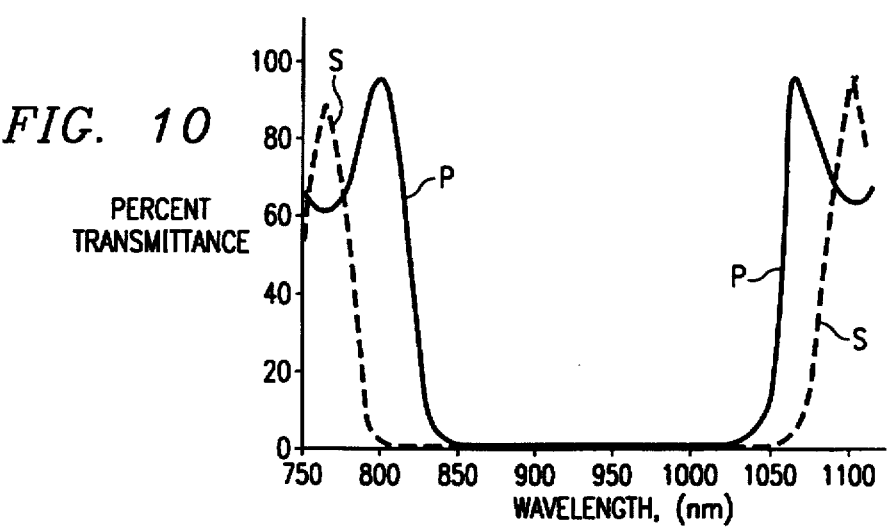
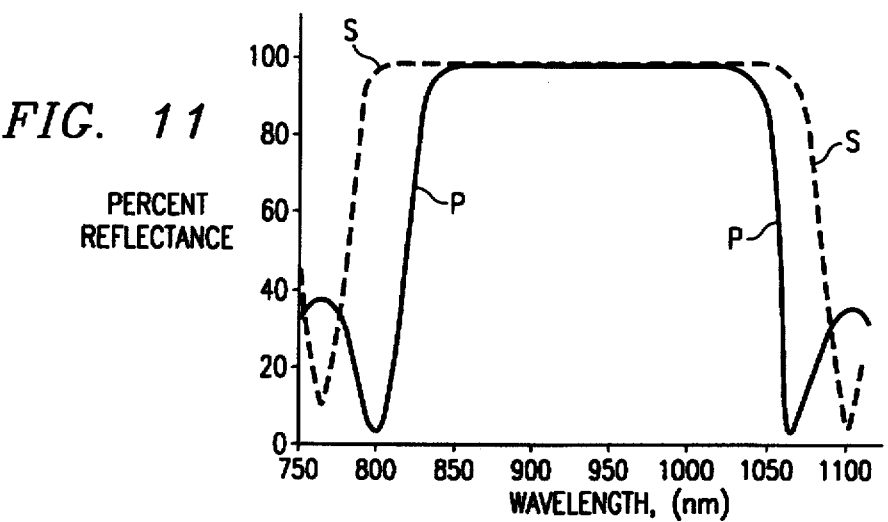
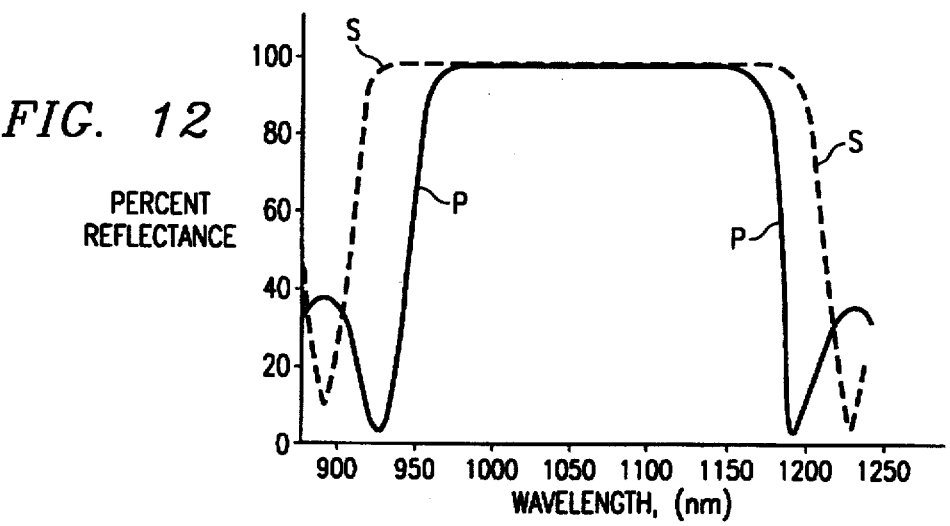

LASER SCANNING SYSTEM WITH OPTICAL TRANSMIT/REFLECT MIRROR HAVING REDUCED RECEIVED SIGNAL LOSS

FIELD OF THE INVENTION

The invention relates to an optical mirror for selectively transmitting and reflecting electromagnetic radiation. In one aspect the invention relates to a laser scanning system employing a solid transmit/reflect mirror. In another aspect the invention relates to a laser scanning system having an optical mirror which passes the laser beam which is to be transmitted toward a target and which reflects a returned beam toward a detector.

BACKGROUND OF THE INVENTION

Krasutsky, Minor and Flowers, U.S. Pat. No. 5,200,606, discloses a laser radar scanning system wherein a laser beam emitted from a solid state laser is passed through a beam expander and a beam segmenter, and the resulting beam segments are passed through an aperture in a transmit/reflect mirror and onto a scanning mirror. The beam segments are reflected by the scanning mirror through a lens structure and a telescope to provide a beam array. When a target reflects at least one beam of the beam array back through the telescope and the lens structure, this returned beam is reflected by the scanning mirror onto the apertured transmit/reflect mirror. As the returned beam has a substantially larger cross-sectional area an the transmitted beam, the returned beam is incident upon the entire reflecting surface of the apertured mirror. The portion of the returned beam striking the apertured mirror is directed through a narrow band filter, and a focus lens onto the receiving end of a fiber optics bundle connected to a plurality of diodes. However, the portion of the returned beam which passes through the aperture in the apertured mirror is not directed toward the radiation detector, represented by the receiving end of the fiber optics bundle, and thus is lost. As a result, the radiation received by the radiation detector is significantly less than the total of the returned beam which is reflected by the scanning mirror. In order to maximize the percentage of the returned beam which is directed to the radiation detector, the aperture in the apertured mirror can be designed to have a cross-sectional area which is as small as possible; however, the cross-sectional area of the aperture must be large enough for the initial beam segments to pass therethrough. For simplicity, the entire disclosure of U.S. Pat. No. 5,200,606 is incorporated herein by reference.

Thus, in order to increase the efficiency of the detection of the returned beam, there remains a need for a laser radar scanning system which can pass a greater percentage of the returned beam to the detector.

SUMMARY OF THE INVENTION

In one aspect, the invention is a transmit/reflect mirror comprising an optical substrate having first and second major faces which are parallel to each other, each of the first and second major sides having an optical area with each optical area being free of apertures extending through the optical substrate. A first optical coating is positioned on the optical area of the first major side of the optical substrate, while a second optical coating is positioned on the optical area of the second major side of the optical substrate. The first optical coating is an antireflection coating which permits an initial beam of radiation having a first wavelength and a first planar polarization component to pass through the first optical coating and the optical substrate. The second optical coating has a first portion thereof covering an inner area of the optical area of the second major face of the optical substrate and a second portion thereof covering an outer area of the optical area of the second major face of the optical substrate. The first portion of the second optical coating is a coating which permits substantially all of the first planar polarization component of the initial beam of radiation to pass through the first portion of the second optical coating and to be directed outwardly from the mirror, and which reflects substantially all radiation incident thereon having the first wavelength and a planar polarization which is orthogonal to the planar polarization of the first planar polarization component. The second portion of the second optical coating is a coating which reflects substantially all radiation incident thereto having the first wavelength regardless of planar polarization. The first portion of the second optical coating can be off-center with respect to the second portion of the second optical coating.

In another aspect, the invention is an optical system which is operable to transmit a first beam of radiation along a first axis and to receive a second beam of radiation which is coaxial with the first beam, the first beam having a first wavelength and a first planar polarization component, the second beam being a reflection of the first beam such that the second beam contains both a p-planar polarized component and an s-planar polarized component and has a greater cross-sectional area than the first beam. The transmit/reflect mirror is positioned so that the first axis extends through the inner area of the optical area of the second major face of the substrate, with the mirror being inclined at a first angle to the first axis. In addition to the transmit/reflect mirror, the optical system comprises a source of radiation having the first wavelength and containing the first planar polarization component; at least one optical element for directing radiation from the source along the first axis toward the transmit/reflect mirror so that the transmit/reflect mirror passes substantially all of the first planar polarization component; at least one optical element for directing the resulting portion of the first planar polarization component, which has been passed through the transmit/reflect mirror, along the first axis outwardly from the transmit/reflect mirror, and for directing the second beam along the first axis toward the transmit/reflect mirror so that the transmit/reflect mirror reflects a substantial portion of the second beam along a second axis which is inclined at a second angle to the first axis; and at least one optical detector for detecting the resulting portion of the second beam which has been reflected along the second axis. The first angle is preferably approximately 45° and the second angle is preferably approximately 90°.

In another aspect, the invention is a method which comprises the steps of:

providing radiation having a first wavelength and containing a first planar polarization component, the first planar polarization component having a first planar polarization;

directing the radiation along a first axis toward a transmit/reflect mirror which has a primary surface and a secondary surface, and wherein the secondary surface has an inner area and an outer area, so that substantially all of the first planar polarization component passes through the primary surface and through the inner area of the secondary surface;

directing the resulting portion of the first planar polarization component, which has been passed through the inner area of the secondary surface, along the first axis outwardly from the transmit/reflect mirror;

directing a second beam along the first axis toward both the inner area and the outer area of the secondary surface of the transmit/reflect mirror, the second beam being a reflection of the first beam such that the second beam contains both a second planar polarized component having the first planar polarization and a third polarized component having a second planar polarization which is orthogonal to the first planar polarization, the second beam having a greater cross-sectional area than the first beam, so that the outer area of the secondary surface reflects along a second axis a substantial portion of each of the second planar polarized component which incident on the outer area and the third planar polarized component which is incident on the outer area, and so that the inner area of the secondary surface reflects along the second axis a substantial portion of the third planar polarized component which is incident on the inner area of the secondary surface while transmitting a substantial portion of the second planar polarized component which is incident on the inner area of the second surface, the second axis being inclined at a first angle to the first axis; and detecting the resulting portions of the second beam which have been reflected along the second axis.

It is presently preferred that at least 90 percent of the first planar polarization component is passed through the transmit/reflect mirror, at least 90 percent of the second planar polarization component which is incident on the outer area of the second surface is reflected along the second axis, at least 90 percent of the third planar polarization component which is incident on the outer area of the second surface is reflected along the second axis, and at least 90 percent of the third planar polarization component which is incident on the inner area of the second surface is reflected along the second axis. In a presently preferred embodiment, the first planar polarization is a p-planar polarization and the second planar polarization is an s-planar polarization.

BRIEF DESCRIPTION OF THE DRAWINGS

FIG. 2 is a front elevational view of the solid transmit/reflect mirror of FIG. 1;

FIG. 3 is a rear elevational view of the solid transmit/reflect mirror of FIG. 2;

FIG. 4 is a side elevational view of the solid transmit/reflect mirror of FIG. 2;

FIG. 5 is a perspective view of the solid transmit/reflect mirror of FIG. 2 with a transmitting beam being passed therethrough;

FIG. 6 is a perspective view of the solid transmit/reflect mirror of FIG. 2 with a received beam being reflected thereby;

FIG. 10 is a graphical representation of the relationship between the wavelength and polarity of the incident beam and the percent transmittance of the p-polarized and s-polarized components of the initial incident beam at a 45° incidence to the coating on the inner area of the secondary side of the transmit/reflect mirror designed for the wavelength of the radiation of interest being 1064 nm and the centerline frequency of the major reflectance zone being approximately 938 nm;

FIG. 11 is a graphical representation of the relationship between the wavelength and polarity of the incident beam and the percent reflection of the polarized and s-polarized components of the returned beam at a 45° incidence to the coating on the inner area of the secondary side of the transmit/reflect mirror designed for the wavelength of the radiation of interest being 1064 nm and the centerline frequency of the major reflectance zone being approximately 938 nm;

FIG. 12 is a graphical representation of the relationship between the wavelength and polarity of the incident beam and the percent reflection of the p-polarized and s-polarized components of the returned beam at a 45° incidence to the coating on the outer area of the secondary side of the transmit/reflect mirror designed for the wavelength of the radiation of interest being 1064 nm and the centerline frequency of the reflectance zone being approximately 1064 nm.

DETAILED DESCRIPTION

Figure 1:
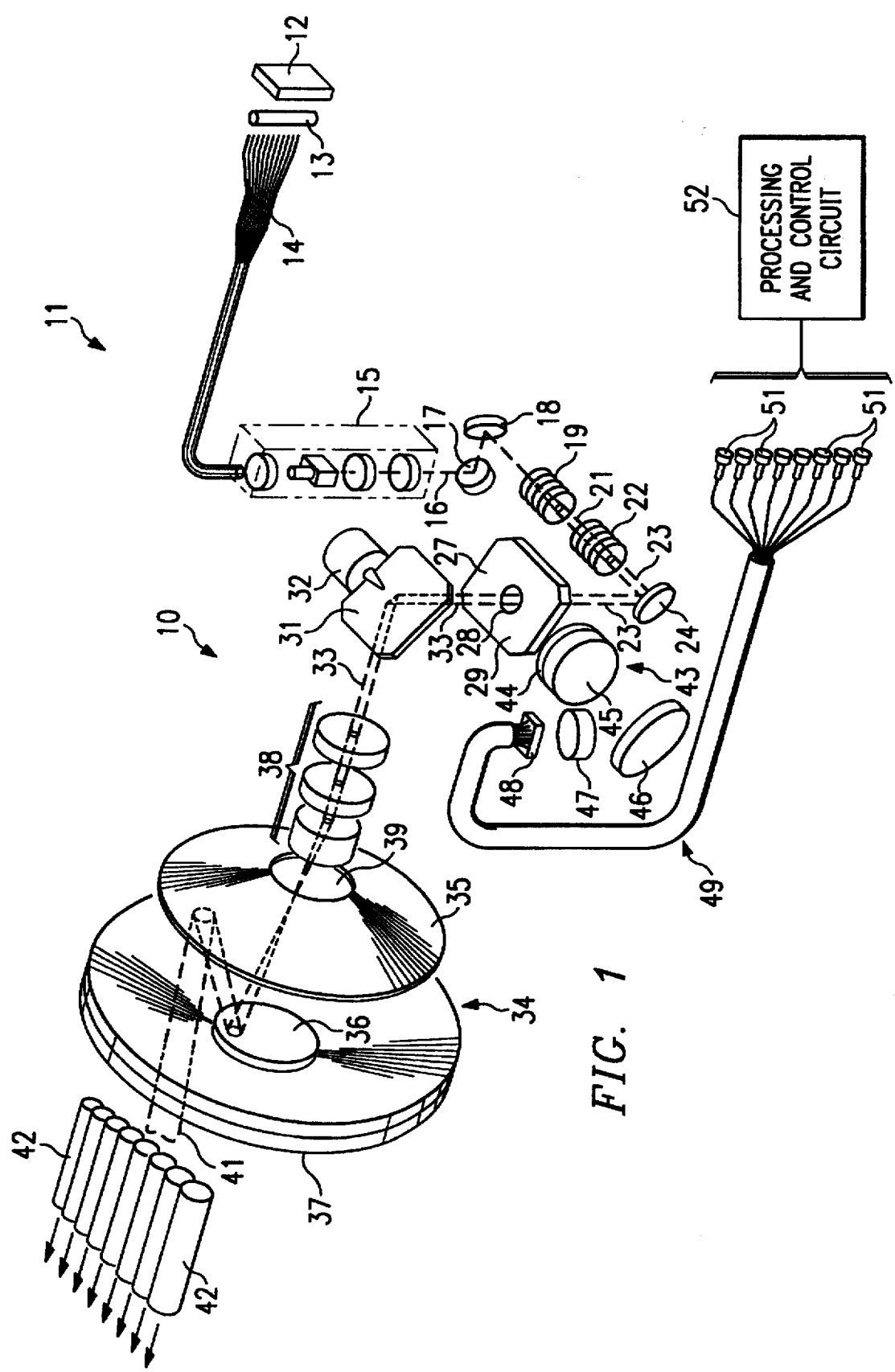
FIG. 1 is an exploded view of several components of an optical train of a LADAR transceiver incorporating a solid transmit/reflect mirror in accordance with a first embodiment of the invention.

FIG. 1 provides an exploded view of some of the optics of the optical train 10 of one embodiment of a LADAR transceiver 11 of a laser seeker and guidance system on a missile, for scanning a target area with laser energy, detecting the reflected laser energy, and computing range and intensity values, permitting the processing of guidance and control signals for the missile as it approaches the target. The output of a suitable laser 12, e.g., a gallium aluminum arsenide (GaAlAs) laser, is transmitted through an input lens 13 and an optic fiber bundle 14 to pump a solid state laser 15, which is mounted on a gimballed frame (not shown) and which emits the laser radiation beam 16, which is the source of the energy employed for illuminating the target. The GaAlAs pumping laser 12 produces a continuous signal of wavelengths suitable for pumping the solid state laser 15, e.g., in the crystal absorption bandwidth. The pumping laser 12 has an output power, suitably in the 10 to 20 watt range, sufficient to actuate the solid state laser 15. The pumping laser 12 is fixedly mounted on the housing (not shown), whereas the solid state laser 15 is mounted on the gimballed frame for movement with the optical system. The fiber optic bundle 14 has sufficient flexibility to permit scanning movement of the seeker head during operation.

The solid state laser 15 can suitably be a Neodymium doped yttrium aluminum garnet (YAG), an yttrium lithium fluoride (YLF), or an Nd:YVO$_4$ laser operable to produce pulses with widths of 10 to 20 nanoseconds and with peak power levels of approximately 10 kilowatts, at repetition rates of 10 to 120 kHz. The equivalent average range of wavelengths of the output radiation is in the near infrared range, e.g., 1.047 or 1.064 microns (1047 nm or 1064 nm).

As seen in FIG. 1, the output beam 16 generated by the solid state laser 15 is successively reflected from the first and second turning mirrors 17 and 18 to the beam expander 19. The beam expander 19 comprises a series of negative and positive lenses which are adapted to expand the diameter of the beam 16 to provide an expanded beam 21, suitably by an 8:1 ratio, while decreasing the divergence of the beam.

The expanded beam 21 is next passed through a beam segmenter 22 for dividing the beam 21 into a plurality of beam segments 23 arrayed on a common plane, initially overlapping, and diverging in a fan-shaped tray. The a divergence of the segmented beams 23 is not so great as to produce separation of the beams 23 within the optical system 10, but preferably is sufficiently great to provide a small degree of separation at the target, as the fan-shaped beam array is scanned back and forth over the target (as will be described below with reference to the output beam array 41).

The illustrated segmenter 22 can comprise a plurality of calcite wedges of approximately 5 to 7 mm diameter, with the wedges being supported within a suitable housing (not shown) which is mounted on the gimballed frame and positioned in coaxial alignment with the expanded beam 21 emitted from the beam expander 19. Three wedges can be employed, each operable as a birefringent crystal to divide a circularly polarized beam into two linearly polarized beams, one vertically polarized and one horizontally polarized and traveling at slightly different angles. Quarter-wave retarders can be interposed between respective adjacent pairs of the calcite wedges for changing the linearly polarized beams, produced by the wedges, back to circularly polarized beams before entering the next wedge, in order to split up each beam once Other beam segmentation techniques can be employed where they allow for overlapping beams. Thus, the segmenter 22 can be replaced by a single holographic diffraction grating which converts one incoming beam 21 to seven outgoing beams 23. While there is an angle between adjacent pairs of the seven segmented beams 23, the angle is so small that the segmented beams 23 are essentially parallel and spatially overlapping within the environment of the equipment.

The resultant segmented beams 23 are then reflected from a third turning mirror 24 toward a first region 25 on the primary side 26 of the solid transmit/reflect mirror 27 so as to pass through the solid transmit/reflect mirror 27, exiting the solid transmit/reflect mirror 27 in a first region 28 of the secondary side 29 of the solid transmit/reflect mirror 27. The beams, which have passed through the solid transmit/reflect mirror 27, are subsequently reflected by a scanning mirror 31 in a forward direction relative to the missile. The region 28 is located off-center with respect to the secondary side 29 of the solid transmit/reflect mirror 27. The scanning mirror 31 is pivotally driven by a scanning drive motor 32, which is operable to cyclically deflect the beam segments 23 for scanning the target area. In one embodiment, the beam segments 23 are deflected at a rate of approximately 100 Hz. The turning axis of the scanning drive motor 32 is aligned in parallel with the wedges of the segmenter 22 whereby the resultant beam array 33 is scanned perpendicularly to the plane in which the beam segments 23 are aligned.

An afocal Cassegrainian telescope 34 is provided for further expanding the emitted beam array 33 and reducing its divergence. The telescope 34 includes a forwardly facing primary mirror 35 and a rearwardly facing secondary mirror 36. A protective outer dome 37, of a suitable transparent thermoplastic or glass material, e.g., BK-7, is mounted forwardly of the secondary mirror 36. A lens structure 38 is mounted in coaxial alignment between the primary mirror 35 and the scanning mirror 31, and an aperture 39 is formed centrally through the primary mirror 35 in alignment with the lens structure 38. The transmitted beam segments 33, which are reflected from the scanning mirror 31, are directed through the lens structure 38 for beam shaping, subsequently directed through the aperture 39 in the primary mirror 35, subsequently reflected from the secondary mirror 36, spaced forwardly of the primary mirror 35, and are then reflected from the front surface of the primary mirror 35. The resultant transmitted beam 41 is a fan-shaped array of beam segments 42 and is scanned about an axis perpendicular to its plane. The illustrated beam array 41 represents one possibility for the diverged spacing of the beam segments 42 as they reach the target, wherein the beam segments 42 are in side-by-side orientation; mutually spaced by a center-to-center distance of twice their diameters.

When a target is illuminated by the array 41 of transmitted beam segments 42, the telescope 34 receives laser energy which has been reflected from the target and which has passed inwardly through the outer dome 37. This received energy is then reflected by the primary mirror 35 onto the secondary mirror 36, and then through the lens assembly 38 so as to be reflected by the scanning mirror 31 toward the secondary side 29 of the solid transmit/reflect mirror 27. Because the reflected beam has a substantially larger cross-sectional area %hah the transmitted beam 41, the reflected beam is incident upon the entire secondary side 29 of the solid transmit/reflect mirror 27, and most of its energy is thus reflected laterally by the solid transmit/reflect mirror 27 toward the collection optics 43. The transmit/reflect mirror 27 is inclined at an acute angle, e.g., 45°, to the beam segments 23 which are incident on the transmit/reflect mirror 27 (first axis). Thus, the energy reflected laterally by the solid transmit/reflect mirror 27 travels along a second axis which is inclined to the first axis at a corresponding angle, e.g., 90°. The collection optics 43 includes a narrow band filter 44, for filtering out wavelengths of radiation above and below a desired laser wavelength to reduce background interference from ambient radiation. The filtered beam then passes through the condensing optics 45 to focus the beam. The focused beam then strikes a fourth turning mirror 46 and is directed toward the receiving ends 48 of a radiation collection fiber optic bundle 49. If desired, a focusing lens structure 47, adapted to focus the beam upon the receiving ends 48 of a radiation collection fiber optic bundle 49, can be positioned between the fourth turning mirror 46 and the receiving ends 48. The opposite ends of each optical fiber in the bundle 49 are connected to illuminate a set of diodes 51 in a detector array, whereby the laser radiation signals are converted to electrical signals which are conducted to a processing and control circuit 52.

The fiber optic bundle 49 can include a plurality of fibers, one of which views scattered radiation from the transmitted pulse to provide a timing start pulse, with each of the remaining fibers respectively receiving laser radiation corresponding to a respective one of the transmitted beam segments. Accordingly, the input ends 48 of the fibers in the bundle 49 are mounted in linear alignment along an axis which is perpendicular to the optical axis. The respective voltage outputs of the diodes 51 thus correspond to the intensity of the laser radiation reflected from mutually parallel linear segments of the target which are perpendicular to the plane of the fan-shaped array of beam segments 42.

The detection system and circuitry are fixedly mounted relative to the housing or other suitable supporting structure, whereby the scanning and azimuth translations of the seeker head do not affect corresponding movement of the detection system. Accordingly, the mass of the components which are translated during scanning is substantially lower than would be the case if all of the components were gimbal mounted.

Referring now to FIGS. 2–4, the solid transmit/reflect mirror 27 comprises a substrate 61 having opposing major faces 62 and 63, a primary side coating 64, and a secondary side coating 65. The opposing major faces 62 and 63 are planar surfaces which are parallel to each other to a high degree of accuracy. Each of the major faces 62 and 63 has an optical area. The term "solid" indicates that transmit/reflect mirror 27 does not have any physical apertures extending therethrough in the optical area of the transmit/reflect mirror 27 upon which the transmitted beam segments 23 impinge or in the optical area of the transmit/reflect mirror 27 upon which a returned beam impinges. In this context, the term "solid" does not exclude the possibility of apertures, e.g., mounting holes, in the transmit/reflect mirror 27 which are located outside of optical area of the mirror, i.e., outside these two impingement portions. The substrate 61 can be any suitable material, e.g., optical glass, fused quartz (also known as fused silica), or synthetic thermoplastic polymeric material, which is transparent to the radiation of interest. A presently preferred material for the substrate 61 is BK-7, grade A, fine annealed. BK-7 and other suitable optical materials are described in MELLES GRIOT 1995/96 OPTICS, OPTO-MECHANICS, LASERS, INSTRUMENTS, pages 4-1 through 4-20, 1995.

The major faces 62 and 63 correspond to the primary and secondary sides 26 and 29, respectively, of the transmit/reflect mirror 27. The primary side coating 64, which covers the first major face 62 to form the primary side 26 of the solid transmit/reflect mirror 27, has a first or inner primary area 66 and a second or outer primary area 67. The second primary area 67 surrounds the first primary area 66 and is contiguous to the first primary area 66 throughout the circumference of the first primary area 66, with the first primary area 66 being the portion 25 of the primary side 26 upon which the beam segments 23 impinge. The construction of the primary side coating 64 in the first and second primary areas 66 and 67 is preferably the same throughout the extent of the primary side coating 64 so that there is no physical delineation between the first and second primary areas 66 and 67. The primary side coating 64 is a planar coating which exhibits a low percent reflectance and high percent transmittance for the planar polarized beam segments 23 which are incident on the primary side 26 of the solid transmit/reflect mirror 27.

While a single layer of a suitable material e.g., $MgF_2$, can be employed as the antireflection primary side coating 64, it is presently preferred that the primary side coating 64 be a multilayer film comprising alternate layers of various index dielectric materials, combined in such a way as to reduce the overall reflectance to an extremely low level for the spectral range of interest. The thickness of each of the layers can be determined by employing various computer programs. In general, a single layer coating and a two layer coating are useful for a narrow band of radiation, while coatings with three or more layers are useful for both broad and narrow band radiation. Suitable multilayer films can be obtained from several commercial manufacturers, e.g., HEBBART® coatings available from Melles Griot, Irvine, Calif. Optical coatings, including single layer $MgF_2$ and HEBBART® multilayer antireflection coatings, are described in MELLES GRIOT 1995/96 OPTICS, OPTO-MECHANICS, LASERS, INSTRUMENTS, pages 5-1 through 5-40. The HEBBART® coatings exhibit a characteristic, double minimum reflectance curve covering a range of some 300 nm in wavelength. Over that wavelength range, the reflectance does not exceed 1.0% and is typically below 0.6%. Within a more limited spectral range on either side of the central peak, the reflectance can be held well below 0.4%. While the HEBBAR® coatings are somewhat insensitive to the angle of incidence, the effect of increasing the angle of incidence is to shift the curve to slightly shorter wavelengths and to increase the long wavelength reflectance slightly.

There are losses associated with multilayer dielectric coatings, which can be divided into scattering and absorption. In absorption, the energy which is lost from the primary beam is dissipated within the coating and usually appears as heat. When the materials which are used in the multilayer coating are transparent, the absorption can be made to be very small, e.g., less than 0.01%. In scattering, the flux lost is deflected and reemerges from the coating in a different direction. Scattering is usually due to defects in the coating which can be classified as volume defects or surface defects. Surface defects are simply a departure from the smooth flat surfaces of the ideal film. Volume defects are local variations of optical constants and are usually dust particles, pinholes or fissures in the coating. By exercising care in the formation of a multilayer coating for use in the visible and near infrared regions, the total of losses due to absorption and scattering can be reduced below 0.05%, or even lower.

The percent transmittance is 100 percent minus the sum of the percent reflectance, the percent absorption, and the percent scattering. However, as each of the percent absorption for low power densities and the percent scattering is generally insignificant in most uses of interest with regard to the present invention, the percent transmittance can be considered on a simplified basis to be 100 percent minus the percent reflectance.

Figure 7:
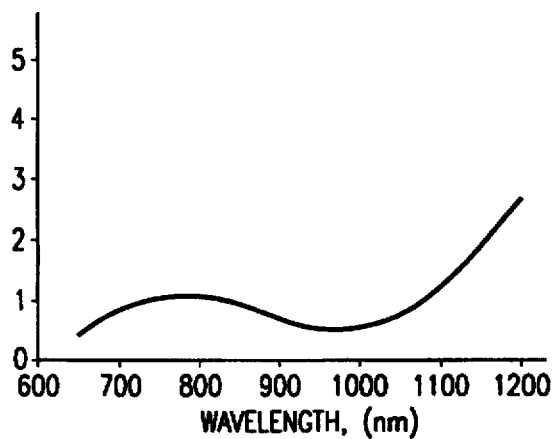
FIG. 7 is a graphical representation of the relationship between the wavelength of the initial p-polarity beam and the percent reflectance of the initial polarity beam, at a 45° incidence, through the antireflection coating on the primary side of the transmit/reflect mirror.

FIG. 7 is a graphical representation of a typical relationship between the wavelength of the planar polarized beam segments 23 which are incident on the primary side 26 of the solid transmit/reflect mirror 27 at an angle of 45° and the percent reflectance of those planar polarized beam segments 23 through the portion of the antireflection coating 64 on the first area 66 of the primary side 26 of the transmit/reflect mirror 27. The particular antireflection coating represented is a HEBBAR® multilayer film stock coating comprising alternate layers of various index dielectric materials and identified with the coating suffix "/077". This coating for the near-infrared covers the range from 700 to 1100 nm and exhibits about 0.8% reflectance for 1064 nm radiation at a 45° angle of incidence.

Figure 8:
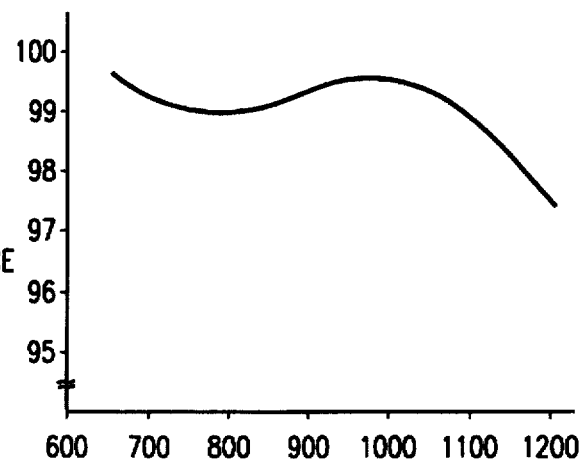
FIG. 8 is a graphical representation of the relationship between the wavelength of the initial polarized beam and the percent transmittance of the initial polarized beam at a 45° incidence through the coating on the primary side of the transmit/reflect mirror.

FIG. 8 is a graphical representation of the relationship between the wavelength of the planar polarized beam segments 23 which are incident of the primary side 26 of the solid transmit/reflect mirror 27 at an angle of 45° and the percent transmittance of those planar polarized beam segments 23 through the portion of the antireflection coating 64 on the first area 66 of the primary side 26 of the transmit/reflect mirror 27, for the same antireflection coating as in FIG. 7. This antireflection coating exhibits about 99.0% transmittance for 1064 nm radiation at a 45° angle of incidence.

In addition to the available stock coatings, other suitable antireflection coatings can be readily prepared by commercial suppliers in response to a specification of the input medium, the substrate, the angle of incidence, the desired percent transmittance, the desired percent reflectance, and the wavelength of interest. The desired power density should also be specified where the power density is sufficiently high so as to present problems of potential damage to the substrate and film coating due to absorption of the radiation. The antireflection coating can be optimized for the wavelength of interest without regard to polarization, but a slight additional gain in percent transmittance can be achieved by optimizing the antireflection coating for the planar polarization of the beam segments 23 incident thereon.

The outer surface of the secondary side coating 65, which covers the secondary major face 63 of the substrate 61 to form the secondary side 29 of the solid transmit/reflect mirror 27, has a first or inner area 68 and a second or outer area 69. The outer area 69 at least substantially surrounds the inner area 68 and is preferably contiguous to the inner area 68 throughout substantially all of the circumference of the inner area 68, with the inner area 68 at least substantially corresponding to the portion 28 of the second side 26 upon which the portion of the beam segments 23 transmitted through the area 66 and the substrate 61 impinge. Ideally, the inner secondary area 68 would correspond exactly to the secondary side portion 28 through which the initial beam segments 23 are transmitted. However, in order to provide for the maximum transmittance of the initial beam segments 23 through the mirror 27, the inner secondary area 68 can be slightly larger than the design area for the secondary side portion 28. The configuration of the inner secondary area 68 depends upon the shape of the initial beam segments 23 and the angle of inclination of the mirror 27 to the initial beam segments 23. Where the initial beam segments 23 collectively have a circular cross-section and the angle of inclination of the mirror is an acute angle to the path of the initial beam segments 23 as they strike the primary side 26 of the transmit/reflect mirror 27, the configuration of the inner secondary area 68 will generally be an oval.

Unlike the primary side coating 64, the construction of the secondary side coating 65 in the inner secondary area 68 is substantially different from the construction of the secondary side coating 65 in the outer secondary area 69. However, the construction of the secondary side coating 65 in the inner secondary area 68 is preferably the same throughout the extent of the inner secondary area 68, and the construction of the secondary side coating 65 in the outer secondary area 69 is preferably the same throughout the extent of the outer secondary area 69. The reason for the difference in construction is that the secondary side coating 65 in the inner secondary area 68 is a coating which exhibits a low reflectance of and a high transmittance for the planar polarized beam segments 23 which are incident on the primary side 26 of the solid transmit/reflect mirror 27, and a high reflectance for radiation having a planar polarization which is orthogonal to the planar polarized beam segments 23, while the secondary side coating 65 in the outer secondary area 69 is a coating which exhibits a high reflectance for all radiation having substantially the same wavelength as the beam segments 23 which are incident on the primary side 26 of the solid transmit/reflect mirror 27 regardless of their planar polarization.

While a single layer of a suitable material can be employed as the secondary coating 65 in the inner secondary area 68 for some applications, it is presently preferred that the secondary coating in the inner secondary area 68 be a multilayer film comprising alternate layers of high and low index dielectric materials, combined in such a way so as to reduce to an extremely low level the reflectance of radiation having the wavelength and planar polarization of the beam segments 23 which are incident on the primary side 26 of the mirror 27 while providing a very high reflectance of radiation having a planar polarization which is orthogonal to the planar polarized beam segments 23. In general, this is accomplished by having an acute angle of incidence of the radiation to the coating so that the s-polarized component and the p-polarized component exhibit very different characteristics at the wavelength of interest. While the high reflectance obtainable with a dielectric multilayer stack is generally obtained over a limited range of wavelengths, the width of the high reflectance zone is a function of the indices of the two dielectric materials utilized in the construction of the multilayer coating. The higher the ratio, the greater is the width of the high reflectance zone. The greater the number of layers, the greater is the reflectance obtainable. The high-reflectance zones will exist at all wavelengths for which the layers in the multilayer coating are an odd number of quarter-wavelengths thick. The maximum reflectance for a given odd number of layers of dielectric materials in a multilayer coating is always obtained with the high index layers outermost. Suitable multilayer films can be obtained from several commercial manufacturers, e.g., the laser line MAX-R® coatings available from Melles Griot, Irvine, Calif. The MAX-R® coatings are stacks of layers selected to achieve the highest possible reflectances at specific laser line wavelengths and at particular angles of incidence. The MAX-R® coatings are described in MELLES GRIOT 1995/96 OPTICS, OPTO-MECHANICS, LASERS, INSTRUMENTS, pages 5-38 through 5-39, 1995. In general, any coating which possesses a sharp edge between transmission and reflection can be used as a transmissive/reflectance polarizer.

Figure 9:
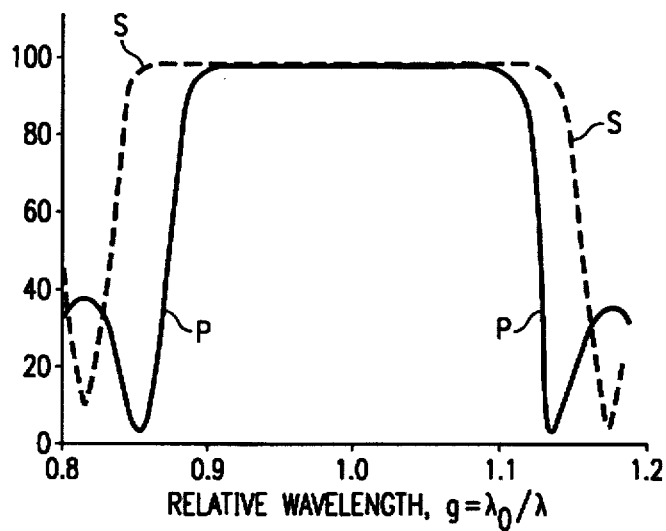
FIG. 9 is a graphical representation of a typical relationship between the ratio of the wavelength of an incident beam to the midpoint wavelength of a maximum reflectance zone and the percent reflectance of the p-polarized and s-polarized components of the beam at a 45° incidence to a multilayer coating.

FIG. 9 is a graphical representation of a typical relationship between the percent reflectance of the p-polarized component and the percent reflectance of the s-polarized component of a beam which is incident to a MAX-R® coating at 45° for ratios of the wavelength of the radiation beam of interest to the wavelength of the center of the high reflectance zone in the range of 0.8 to 1.2. $\lambda_0$ is the wavelength of the incident radiation of interest and $\lambda$ is the centerline wavelength of the high reflectance zone. The width of the high reflectance zone for p-polarized radiation is always less than that for s-polarized radiation. Within each of the left and right regions which are outside of the p-polarized high reflectance zone but inside of the s-polarized high reflectance zone, the transmittance is low for the s-polarized radiation but high for the p-polarized radiation, so that the multilayer coating acts as a polarizer. These regions are quite narrow so that the multilayer coating will not operate as a polarizer over a wide wavelength range, but for single wavelengths, such as a laser line, it can be very effective. The ripple in the transmission for the p-polarized radiation can be reduced by using any of the techniques described in Chapter 6 of H. A. Macleod, *Thin-Film Optical Filters*, Second Edition, 1986, Macmillan Publishing Company, New York. The multilayer dielectric coating is normally employed as a longwave-pass filter as this involves thinner layers and less material in the coating than would a shortwave-pass filter.

Thus, in FIG. 9, when the wavelength of the incident radiation is in the range of 0.9 to 1.1 times the wavelength at the centerline of the major reflectance peak, the percent reflectance of each of the p-polarized component and the s-polarized component is approximately 99%. However, when the wavelength of the incident radiation is approximately 1.135 times the wavelength at the centerline of the major reflectance peak, the percent reflectance of the p-polarized component is only about 2% while the percent reflectance of the s-polarized component is still approximately 99%. Thus, this typical coating can be considered to provide approximately 99% reflectance of the s-polarized component and approximately 98% transmittance of the p-polarized component where the coating is designed for the wavelength of the radiation of interest being approximately 1.135 times the design wavelength for the centerline of the major reflectance peak exhibited by the coating. Similarly, such coating can be considered to provide approximately 99% reflectance of both of the s-polarized component and the p-polarized component where the coating is designed for the wavelength of the radiation of interest being approximately equal to the design wavelength for the centerline of the major reflectance peak exhibited by the coating.

The operation of these plane polarizing beamsplitter coatings can be understood by considering each to be a pile-of-plates polarizer which is a quarter-wave resonant reflective multilayer dielectric stack designed for 45° incidence. Because the total thickness of the multilayer film is only a few wavelengths, there are no ghost image problems associated with this film. At every dielectric interfaced within the stack, the radiation is incident at or near Brewster's angle (also called the polarizing angle), and the p-polarized component is therefore transmitted with almost no reflection. In contrast, the s-polarized component is partially reflected at each interface. By resonance among these many partial reflections, the total reflectance of the stack for s-polarized radiation is raised to 99% or better.

Suitable reflection/transmittance coatings can be readily prepared by commercial suppliers in response to a specification of the substrate, the angle of incidence, the output medium, the desired percent transmittance of the first planar polarized component, the desired percent reflectance for the second planar polarized component having a planar polarization which is orthogonal to the planar polarization of the first planar polarized component, and the wavelength of the radiation of interest. The desired power density should also be specified where the power density is sufficiently high so as to present problems of potential damage to the substrate and film coating due to absorption of the radiation.

While a single layer of a suitable material can be employed as the secondary coating 65 in the outer secondary area 69 for some applications, it is presently preferred that the secondary coating in the outer secondary area 69 be a multilayer film comprising alternate layers of high and low index dielectric materials, combined in such a way so as to provide a very high reflectance of radiation, regardless of planar polarization, incident thereon wherein such radiation has substantially the same wavelength as the beam segments 23 which are incident on the primary side 26 of the mirror 27. In general, even with the acute angle of incidence of the radiation to the reflective multilayer coating, this can be accomplished by designing the reflective multilayer coating so that the wavelength of the incident radiation of interest is in the portion of the maximum reflectance zone for the p-polarized component which overlaps the maximum reflectance zone for the s-polarized component, i.e., having a relative wavelength in the range of 0.9 to 1.1 as illustrated in FIG. 9.

For example, where the wavelength of the laser beam 16 is 1064 nm and the beam segments 23 are p-polarized, the primary side coating 64 can be an antireflective coating having a transmittance of about 99% for the p-polarized incident beam segments 23 and only about 0.5% transmittance of any s-polarized component within the design wavelength range for the primary side coating 64. To ensure peak performance, the incident radiation should strike the primary side coating 64 at an angle of 45±2°. As shown in FIGS. 10 and 11, the first or inner area 68 of the secondary side coating 65 can be a MAX-R® coating designed with a centerline wavelength of the maximum reflectance zone at approximately 938 nm so that the coating exhibits a transmittance of about 99% for the p-polarized incident beam segments 23 having a wavelength of 1064 nm and a reflectance of about 99.5% for any s-polarized incident beam having a wavelength of 1064 nm. As shown in FIG. 12, the secondary side coating 55 in the outer area 69 can be a MAX-R® coating designed with a centerline wavelength for the maximum reflectance zone at 1064 nm which reflects 99.5% of all radiation incident thereon within the range of 950 to 1200 nm, regardless of its planar polarization. To ensure peak performance, the incident radiation should strike the secondary side coating 65 at an angle of 45±2°.

Thus, with regard to the curves illustrated in FIG. 12, the reflective multilayer coating for the outer secondary area 69 can be designed with the ratio of the wavelength of the radiation of interest to the center wavelength of the maximum reflectance zone being in the range of 0.9 to 1.1, so that the coating exhibits maximum reflectance for both of the s-polarized component and the p-polarized component of the wavelength of the radiation of interest.

With the solid transmit/reflect mirror 27 having the differentiated construction of the two areas of the secondary side coating 65, a very high percentage of the p-polarized component of the beam segments 23 is transmitted through the first area 66 of the primary side coating 64, the substrate 61, and the first area 68 of the secondary side coating 65. The radiation beam which is returned from the target, and which contains both a p-polarized component and an s-polarized component, strikes the secondary side 29 of the transmit/reflect mirror 27, and the outer area 69 of the secondary side coating 65 reflects substantially all of the returned radiation of the relevant wavelengths incident thereon (i.e., both the p-polarized component of the returned beam and the s-polarized component of the returned beam), while the inner area 68 of the secondary side coating 65 reflects substantially all of the returned radiation incident thereon having the relevant wavelengths and having a planar polarization orthogonal to the planar polarization of the beam segments 23 (i.e., the s-polarized component of the returned beam). Thus, by the addition of the reflection of the s-polarized component of the returned beam by the inner area 69, the present invention permits a substantial increase in the percentage of the returned beam which is directed to the detectors, as compared with the apertured mirror where that portion of the s-polarized component would be lost.

While it is possible to apply only the transmissive/reflective coating to the inner secondary area 68 and only the reflective coating to the outer secondary area 69, it is presently preferred to apply the transmissive/reflective coating to the entire optical area of the secondary side 29, and then to place a mask over the inner area 68 and thereafter apply the reflective coating only to the unmasked portion of the optical area, while the mask is maintained in its desired position. In general, the maintenance of the position of the mask can be achieved with a cantilever element which extends from the mask to the closest adjacent edge of the transmit/reflect mirror 27, thereby resulting in a narrow strip 71 of the secondary side 29 between the inner area 68 and the adjacent edge 72 with the initial transmissive/reflective coating but not the subsequently applied reflective coating. The presence of the transmissive/reflective coating between the substrate 61 and the reflective coating in the outer area 69 does not interfere with the functioning of the reflective coating, and this technique simplifies the manufacture of the transmit/reflect mirror. While the thickness of the inner area 69 in the resulting secondary side coating 65 is slightly smaller than the thickness of the secondary side coating 65 in the outer area 69, this difference in thickness is minor and does not significantly affect the reflectance properties of the secondary coating 65. As noted above, there are no apertures extending through the optical areas of the mirror 27.

Common dielectric materials for constructing multilayer coatings for the visible region include zinc sulphide, titanium dioxide, zirconium dioxide, and cerium dioxide as useful high index materials, and cryolite, magnesium fluoride, quartz, and silicon oxide as useful low index materials. Common dielectric materials for constructing multilayer coatings for the ultraviolet region include antimony trioxide and cryolite. Common dielectric materials for constructing multilayer coatings for the near infrared region include silicon monoxide, calcium fluoride, magnesium fluoride, cerium fluoride, and thorium fluoride as good low index materials. Common dielectric materials for constructing multilayer coatings for the infrared region include germanium and lead telluride as good high index materials, and zinc sulfide as a useful low index material.

Procedures for the formation of each of the multilayer coatings are described in MELLES GRIOT 1995/96 OPTICS, OPTO-MECHANICS, LASERS, INSTRUMENTS, pages 5-18 through 5-20, 1995, and in H. A. Macleod, *Thin-Film Optical Filters*, Second Edition, Macmillan Publishing Company, New York, 1986, pages 357-368.

The particular dielectric materials selected for the layers of the primary side coating 64, the reflective outer area 69 of the secondary side coating 65, and the transmit/reflect inner area 68 of the secondary side coating 65, and the thickness of each of the layers will depend upon the use to which the particular transmit/reflect mirror is applied, and are within the scope of one of ordinary skill in the art to determine in accordance with known techniques.

Figure 13:
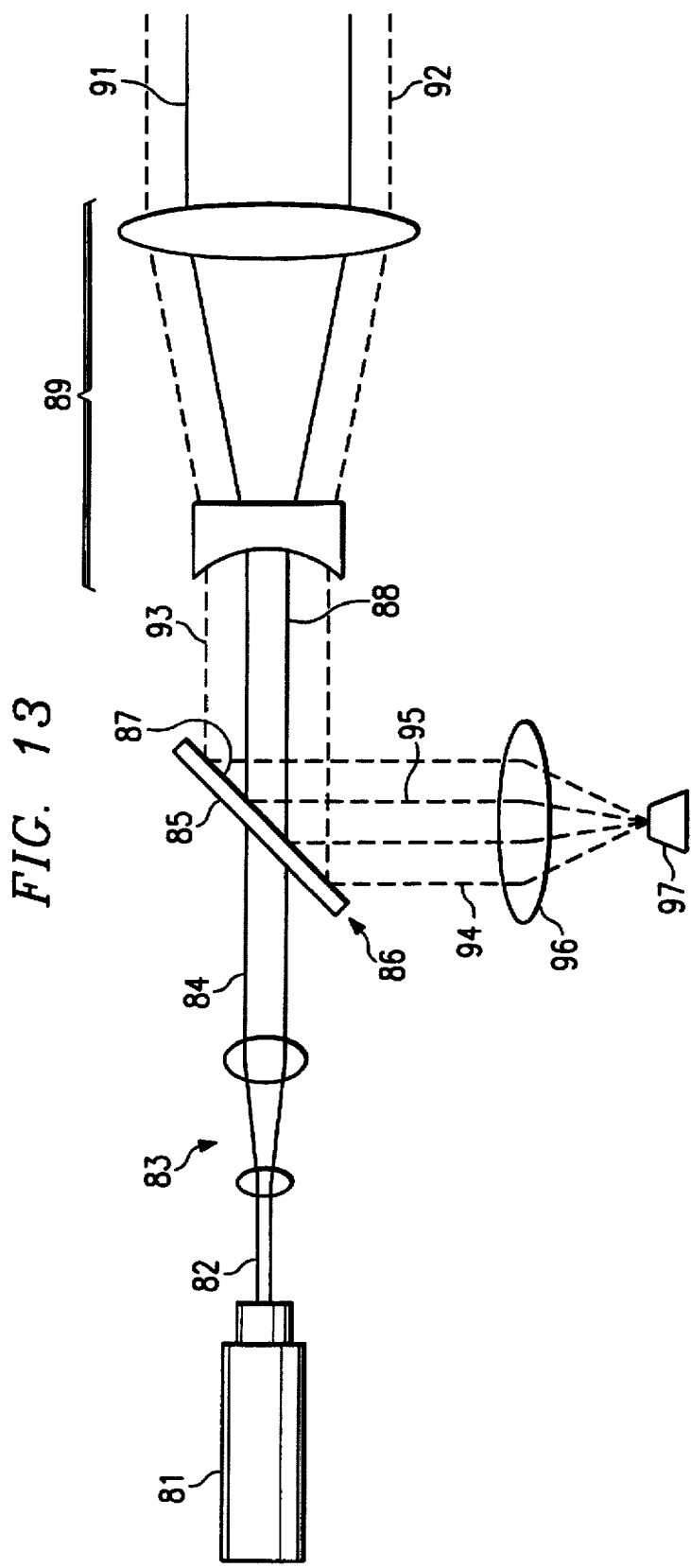
FIG. 13 is a diagrammatic representation of an optical train incorporating a solid transmit/reflect mirror in accordance with a second embodiment of the invention.

Referring now to FIG. 13, the second embodiment of the invention comprises a laser 81 which serves as the source of the radiation beam 82 having a p-planar polarization component. The beam 82 is passed through a beam expander 83 and the expanded beam 84 strikes the primary surface 85 of the transmit/reflect mirror 86. The mirror 86 can be identical to mirror 27 of the first embodiment. The p-planar polarization beam 88 emerges from the secondary side of the mirror 86 and is passed through a refractive telescope 89 to become the outgoing beam 91. A returned beam 92, having been reflected by a target and having substantially the same wavelength as the outgoing beam 91 and containing both a p-planar polarization component and an s-planar polarization component, is concentrated by the refractive telescope 89 so that the concentrated beam 93 strikes the secondary side 87 of the mirror 86. Both the s-planar polarization component and the p-planar polarization component of the concentrated beam 93 incident on the outer area of the secondary side 87 of the mirror 86 are reflected by the outer area of the secondary side 87 of the mirror 86 as the beam 94, while the s-planar polarization component of the concentrated beam 93 incident on the inner area of the secondary side 87 of the mirror 86 is reflected by the inner area of the secondary side 87 of the mirror 86 as the beam 95. Beams 94 and 95 are directed through the receiver lens 96 onto the radiation detector 97. Thus, the second embodiment is a smaller and simpler system which can be employed as a hand-held device for measuring the speed of moving vehicles. While such devices can employ less expensive coatings on the primary and secondary sides of the transmit/reflect mirror, it is generally desirable that at least 90 percent of the p-planar polarization component 84 be passed through the transmit/reflect mirror 86, that at least 90 percent of the s-planar polarization component which is incident on the secondary mirror surface be reflected to the detector 97, and that at least 90 percent of the p-polarization component which is incident on the outer area of the secondary mirror surface be reflected to the detector 97.

Reasonable variations and modifications of the invention are possible within the scope of the foregoing disclosure and the appended claims to the invention.

That which is claimed is:

1. A transmit/reflect mirror comprising:

an optical substrate having first and second major faces which are parallel to each other, each of said first and second major faces having an optical area, each optical area being free of apertures extending through said optical substrate;

a first optical coating positioned on said optical area of said first major face of said optical substrate;

a second optical coating positioned on said optical area of said second major face of said optical substrate;

said first optical coating being an antireflection coating which permits an initial beam of radiation having a first wavelength and a first planar polarization component to pass through said first optical coating and said optical substrate, said first planar polarization component having a first planar polarization;

said second optical coating having a first portion thereof covering an inner area of the optical area of said second major face of said optical substrate and a second portion thereof covering an outer area of the optical area of said second major face of said optical substrate;

said first portion of said second optical coating being a coating which permits substantially all of said first planar polarization component of said initial beam of radiation to pass through said first portion of said second optical coating and to be directed outwardly from said mirror, and which reflects substantially all radiation incident thereon having said first wavelength and a planar polarization which is orthogonal to the first planar polarization of said first planar polarization component; and said second portion of said second optical coating being a coating which reflects substantially all radiation incident thereto having said first wavelength.

2. A transmit/reflect mirror in accordance with claim 1, wherein said first portion of said second optical coating is off-center with respect to said second portion of said second optical coating.

3. A transmit/reflect mirror in accordance with claim 1, wherein said second portion of said second optical coating at least substantially surrounds said first portion of said second optical coating and is contiguous to said first portion of said second optical coating at least substantially throughout a circumference of said first portion of said second optical coating.

4. A transmit/reflect mirror in accordance with claim 1, wherein said first optical coating is multilayer film, wherein each layer of said multilayer film is a dielectric material, wherein alternate layers of said multilayer film have differing indices, and wherein said multilayer film provides a very low level of overall reflectance of radiation of said first wavelength.

5. A transmit/reflect mirror in accordance with claim 1, wherein said first portion of said second optical coating is a multilayer film, Wherein each layer of said multilayer film is a dielectric material, wherein alternate layers of said multilayer film have differing indices, wherein the multilayer film provides a very low level of overall reflectance of said first planar polarization component, and wherein the multilayer film provides a high level of overall reflectance of radiation of said first wavelength having a planar polarization which is orthogonal to the first planar polarization of said first planar polarization component.

6. A transmit/reflect mirror in accordance with claim 1, wherein said second portion of said second optical coating is a multilayer film, wherein each layer of said multilayer film is a dielectric material, wherein alternate layers of said multilayer film have differing indices, and wherein the multilayer film provides a high level of overall reflectance of radiation Of said first wavelength having a planar polarization which either is the same as the first planar polarization of said first planar polarization component or is a planar polarization which is orthogonal to the first planar polarization of said first planar polarization component.

7. A transmit/reflect mirror in accordance with claim 1, wherein said first portion of said second optical coating is a first multilayer film, wherein each layer of said first multilayer film is a dielectric material, wherein alternate layers of said first multilayer film have differing indices, wherein the first multilayer film provides a very low level of overall reflectance of said first planar polarization component, and wherein the first multilayer film provides a high level of overall reflectance of radiation of said first wavelength having a planar polarization which is orthogonal to the first planar polarization of said first planar polarization component; and wherein said second portion of said second optical coating is a second multilayer film, wherein each layer of said second multilayer film is a dielectric material, wherein alternate layers of said second multilayer film have differing indices, and wherein the second multilayer film provides a high level of overall reflectance of radiation of said first wavelength having a planar polarization which either is the same as the first planar polarization of said first planar polarization component or is a planar polarization which is orthogonal to the first planar polarization said first planar polarization component.

8. A transmit/reflect mirror in accordance with claim 7, wherein said first optical coating is a third multilayer film, wherein each layer of said third multilayer film is a dielectric material, wherein alternate layers of said third multilayer film have differing indices, and wherein said third multilayer film provides a very low level of overall reflectance of radiation of said first wavelength.

9. A transmit/reflect mirror in accordance with claim 1, wherein said first optical coating provides at least 90 percent transmittance for said first planar polarization component, wherein said first portion of said second optical coating provides at least 90 percent transmittance for said first planar polarization component and at least 90 percent reflectance for radiation having said first wavelength and a planar polarization which is orthogonal to the first planar polarization of said first planar polarization component, and wherein said second portion of said second optical coating provides at least 90 percent reflectance for radiation of said first wavelength and the same polarization as said first planar polarization component and at least 90 percent reflectance for radiation having said first wavelength and a planar polarization which is orthogonal to the first planar polarization of said first planar polarization component.

10. A transmit/reflect mirror in accordance with claim 7, wherein said first multilayer film covers the optical area of said second major face of said optical substrate, and wherein said second multilayer film covers the portion of said first multilayer film which covers said outer area of said second major face.

11. An optical system operable to transmit a first beam of radiation along a first axis and to receive a second beam of radiation which is coaxial with said first beam, the first beam having a first wavelength and a first planar polarization component, said second beam being a reflection of said first beam such that said second beam contains both a p-planar polarized component and an s-planar polarized component and has a greater cross-sectional area than said first beam, said optical system comprising:

a transmit/reflect mirror;

a source of radiation having said first wavelength and containing said first planar polarization component;

at least one optical element for directing radiation from said source along said first axis toward said transmit/reflect mirror so that said transmit/reflect mirror passes substantially all of said first planar polarization component;

at least one optical element for directing the resulting portion of said first planar polarization component, which has been passed through said transmit/reflect mirror, along said first axis outwardly from said transmit/reflect mirror, and for directing said second beam along said first axis toward said transmit/reflect mirror so that said transmit/reflect mirror reflects a substantial portion of said second beam along a second axis which is inclined at a first angle to said first axis;

at least one optical detector for detecting the resulting portion of said second beam which has been reflected along said second axis;

wherein said transmit/reflect mirror comprises:

an optical substrate having first and second major faces which are parallel to each other and are inclined to said first axis at a second angle, each of said first and second major faces having an optical area, each optical area being free of apertures extending through said optical substrate;

a first optical coating positioned on said optical area of said first major face of said optical substrate;

a second optical coating positioned on said optical area of said second major face of said optical substrate;

said first optical coating being an antireflection coating which permits an initial beam of radiation having a first wavelength and a first planar polarization component to pass through said first optical coating and said optical substrate, said first planar polarization component having a first planar polarization;

said second optical coating having a first portion thereof covering an inner area of the optical area of said second major face of said optical substrate and a second portion thereof covering an outer area of the optical area of said second major face of said optical substrate, such that said first axis extends through said inner area;

said first portion of said second optical coating being a coating which permits substantially all of said first planar polarization component of said initial beam of radiation to pass through said first portion of said second optical coating and to be directed outwardly from said mirror, and which reflects substantially all radiation incident thereon having said first wavelength and a planar polarization which is orthogonal to the first planar polarization said first planar polarization component; and said second portion of said second optical coating being a coating which reflects substantially all radiation incident thereto having said first wavelength.

12. An optical system in accordance with claim 11, wherein said first angle is approximately 90° and said second angle is approximately 45°.

13. An optical system in accordance with claim 11, wherein said first portion of said second optical coating is off-center with respect to said second portion of said second optical coating.

14. An optical system in accordance with claim 11, wherein said second portion of said second optical coating at least substantially surrounds said first portion of said second optical coating and is contiguous to said first portion of said second optical coating at least substantially throughout a circumference of said first portion of said second optical coating.

15. An optical system in accordance with claim 11, wherein said first optical coating is multilayer film, wherein each layer of said multilayer film is a dielectric material, wherein alternate layers of said multilayer film have differing indices, and wherein said multilayer film provides a very low level of overall reflectance of radiation of said first wavelength.

16. An optical system in accordance with claim 11, wherein said first portion of said second optical coating is a multilayer film, wherein each layer of said multilayer film is a dielectric material, wherein alternate layers of said multilayer film have differing indices, wherein the multilayer film provides a very low level of overall reflectance of said first planar polarization component, and wherein the multilayer film provides a high level of overall reflectance of radiation of said first wavelength having a planar polarization which is orthogonal to the first planar polarization of said first planar polarization component.

17. An optical system in accordance with claim 11, wherein said second portion of said second optical coating is a multilayer film, wherein each layer of said multilayer film is a dielectric material, wherein alternate layers of said multilayer film have differing indices, and wherein the multilayer film provides a high level of overall reflectance of radiation of said first wavelength having a planar polarization which either is the same the first planar polarization of said first planar polarization component or is a planar polarization which is orthogonal to the first planar polarization of said first planar polarization component.

18. An optical system in accordance with claim 11, wherein said first portion of said second optical coating is a first multilayer film, wherein each layer of said first multilayer film is a dielectric material, wherein alternate layers of said first multilayer film have differing indices, wherein the first multilayer film provides a very low level of overall reflectance of said first planar polarization component, and wherein the first multilayer film provides a high level of overall reflectance of radiation of said first wavelength having a planar polarization which is orthogonal to the first planar polarization of said first planar polarization component; and wherein said second portion of said second optical coating is a second multilayer film, wherein each layer of said second multilayer film is a dielectric material, wherein alternate layers of said second multilayer film have differing indices, and wherein the second multilayer film provides a high level of overall reflectance of radiation of said first wavelength having a planar polarization which either is the same as the first planar polarization of said first planar polarization component or is a planar polarization which is orthogonal to the first planar polarization of said first planar polarization component.

19. An optical system in accordance with claim 18, wherein said first optical coating is a third multilayer film, wherein each layer of said third multilayer film is a dielectric material, wherein alternate layers of said third multilayer film have differing indices, and wherein said third multilayer film provides a very low level of overall reflectance of radiation of said first wavelength.

20. An optical system in accordance with claim 18, wherein said first multilayer film covers the optical area of said second major face of said optical substrate, and wherein said second multilayer film covers the portion of said first multilayer film which covers said outer area of said second major face.

21. An optical system in accordance with claim 11, wherein said first optical coating provides at least 90 percent transmittance for said first planar polarization component, wherein said first portion of said second optical coating provides at least 90 percent transmittance for said first planar polarization component and at least 90 percent reflectance for radiation having said first wavelength and a planar polarization which is orthogonal to the first planar polarization of said first planar polarization component, and wherein said second portion of said second optical coating provides at least 90 percent reflectance for radiation of said first wavelength and the same polarization at said first planar polarization component and at least 90 percent reflectance for radiation having said first wavelength and a planar polarization which is orthogonal to the first planar polarization of said first planar polarization component.

22. A method comprising:

providing radiation having a first wavelength and containing a first planar polarization component, said first planar polarization component having a first planar polarization;

directing said radiation along a first axis toward a transmit/reflect mirror which has a primary surface and a secondary surface, and wherein said secondary surface has an inner area and an outer area, so that substantially all of said first planar polarization component passes through said primary surface and through said inner area of said secondary surface;

directing the resulting portion of first planar polarization component, which has been passed through said inner area of said secondary surface, along said first axis outwardly from said transmit/reflect mirror;

directing a second beam along said first axis toward both said inner area and said outer area of said secondary surface of said transmit/reflect mirror, said second beam being a reflection of said first beam such that said second beam contains both a second planar polarized component having said first planar polarization and a third polarized component having a second planar polarization which is orthogonal to said first planar polarization, said second beam having a greater cross-sectional area than said first beam, so that said outer area of said secondary surface reflects along a second axis a substantial portion of each of the second planar polarized component which is incident on said outer area and the third planar polarized component which is incident on said outer area, and so that said inner area of said secondary surface reflects along said second axis a substantial portion of the third planar polarized component which is incident on said inner area of said secondary surface while transmitting a substantial portion of the second planar polarized component which is incident on said inner area of said second surface, said second axis being inclined at a first angle to said first axis; and detecting the resulting portions of said second beam which have been reflected along said second axis.

23. A method in accordance with claim 22, wherein said transmit/reflect mirror comprises:

an optical substrate having first and second major faces which are parallel to each other and are inclined to said first axis at a second angle, each of said first and second major faces having an optical area;

a first optical coating positioned on said optical area of said first major face of said optical substrate;

a second optical coating positioned on said optical area of said second major face of said optical substrate;

said first optical coating being an antireflection coating which permits radiation having said first planar polarization component to pass through said first optical coating and said optical substrate;

said second optical coating having a first portion thereof covering an inner area of the optical area of said second major face of said optical substrate so as to constitute said inner area of said secondary surface, and a second portion thereof covering an outer area of the optical area of said second major face of said optical substrate so as to constitute said outer area of said secondary surface, said optical substrate being positioned such that said first axis extends through said inner area of said secondary surface;

said first portion of said second optical coating being a coating which permits substantially all of said first planar polarization component to pass through said first portion of said second optical coating and to be directed outwardly from said mirror, and which reflects substantially all radiation incident thereon having said first wavelength and a planar polarization which is orthogonal to the first planar polarization of said first planar polarization component; and said second portion of said second optical coating being a coating which reflects substantially all radiation incident thereto having said first wavelength.

24. A method in accordance with claim 22, wherein at least 90 percent of said first planar polarization component is passed through said transmit/reflect mirror, wherein at least 90 percent of said second planar polarization component which is incident on said outer area of said second surface is reflected along said second axis, wherein at least 90 percent of said third planar polarization component which is incident on said outer area of said second surface is reflected along said second axis, and wherein at least 90 percent of said third planar polarization component which is incident on said inner area of said second surface is reflected along said second axis.

25. A method in accordance with claim 24, wherein said first planar polarization is a p-planar polarization, and wherein said second planar polarization is an s-planar polarization.

* * * * *